United States Patent
Vogler et al.

(10) Patent No.: US 10,265,967 B2
(45) Date of Patent: Apr. 23, 2019

(54) CONTROL PROCEDURE FOR A LASER MARKING MATRIX SYSTEM

(71) Applicant: MACSA ID, S.A., Sant Fruitos de Bages (Barcelona) (ES)

(72) Inventors: Sven Alexander Vogler, Sant Fruitos de Bages (ES); Valenti Boira Plans, Sant Fruitos de Bages (ES); Joan Camps Claramunt, Manresa (ES); Francesc Bravo Montero, Sant Fruitos de Bages (ES)

(73) Assignee: MACSA ID, S.A., Sant Fruitos de Bages (Barcelona) (ES)

( * ) Notice: Subject to any disclaimer, the term of this patent is extended or adjusted under 35 U.S.C. 154(b) by 0 days.

(21) Appl. No.: 15/604,578

(22) Filed: May 24, 2017

(65) Prior Publication Data
US 2018/0001659 A1    Jan. 4, 2018

(30) Foreign Application Priority Data
May 27, 2016 (ES) ..................... 1630699

(51) Int. Cl.
*B41J 2/47* (2006.01)
*B41J 2/447* (2006.01)
(Continued)

(52) U.S. Cl.
CPC ........... *B41J 2/471* (2013.01); *B23K 26/0604* (2013.01); *B23K 26/352* (2015.10);
(Continued)

(58) Field of Classification Search
CPC .................. B41J 2/471; B41J 2/455
See application file for complete search history.

(56) References Cited

U.S. PATENT DOCUMENTS

| 5,337,325 A | 8/1994 | Hwang |
| 6,201,210 B1 * | 3/2001 | Sans I Ravellat ..... G06K 1/126 219/121.61 |

FOREIGN PATENT DOCUMENTS

| DE | 4316829 A1 | 11/1994 |
| EP | 0950973 A2 | 10/1999 |
| | (Continued) | |

OTHER PUBLICATIONS

Extended European Search Report for Application No. 17382286.7 dated Nov. 6, 2017 in 8 pages.
(Continued)

*Primary Examiner* — Huan H Tran
(74) *Attorney, Agent, or Firm* — Knobbe, Martens, Olson & Bear, LLP (57) ABSTRACT

Method of controlling a laser marking matrix system, the matrix system comprising an N×M matrix of lasers to produce the laser marking, the method comprising the sequential transformation of at least two images to be marked into a series of marking commands according to an N×M matrix of dots, which comprises the following phases:
  division of a first image into a fixed portion and a variable portion,
  transformation of the fixed portion into a fixed matrix and the variable portion into a variable matrix,
  combination of said fixed and variable matrices,
  laser marking of the first image,
  processing of a second image, obtaining a new variable matrix which is added to the previous fixed matrix, producing a complete new matrix,
  laser marking of the second image.

14 Claims, 7 Drawing Sheets

(51) Int. Cl.
*B23K 26/06* (2014.01)
*B23K 26/362* (2014.01)
*B23K 26/70* (2014.01)
*B41J 2/455* (2006.01)
*B23K 26/352* (2014.01)

(52) U.S. Cl.
CPC .......... *B23K 26/355* (2018.08); *B23K 26/362* (2013.01); *B23K 26/70* (2015.10); *B41J 2/455* (2013.01)

(56) References Cited

FOREIGN PATENT DOCUMENTS

| EP | 1463296 | A2 |   | 9/2004  |         |            |
|----|---------|----|---|---------|---------|------------|
| ES | 2140341 |    | * | 2/2000  | ......... | G06K 15/1261 |
| ES | 2192485 |    | * | 10/2003 | ............. | B41J 2/445 |
| JP | H0823416 | A |   | 1/1996  |         |            |
| JP | 2011259189 | A |   | 12/2011 |         |            |

OTHER PUBLICATIONS

Search Reported dated Apr. 25, 2017 in corresponding ES application No. 201630699.

\* cited by examiner

CONTROL PROCEDURE FOR A LASER MARKING MATRIX SYSTEM

The present invention relates to the technical sector of object marking systems. More specifically, the invention relates to the sector of marking the surface of objects, including objects that are moving, by laser beam.

In the known prior art, Spanish patent document ES2140341 discloses a laser marking system which uses a laser beam from at least one laser diode for each dot in an N or N×M matrix, N being the vertical or raster dots, and M the number of dots over the width of the matrix in order to mark a surface of an object.

Spanish patent document ES2192485 discloses a method in which an image is transformed into an N×M matrix of laser beams, the marking of the image being produced at a single moment in time. The method comprises a first step, the formation of the image in a computer, by converting said image into an N×M matrix of laser beams using a video graphics array (VGA) converter. Said laser beams or light beams are subject to spatial phase modulation which angularly deflects the individual light beams by means of micromirrors and then concentrates the selected signals on the object to be marked.

The words encoder or position sensor system in the present application refer to any position sensor suitable for sensing the real position of a product to be marked. In particular, said words also comprise those known as resolvers, which in some literature are referred to as analogue encoders, as opposed to digital encoders. The word encoder also includes sensors other than rotary encoders which are capable of carrying out the same function, although rotary coders are the most common type of encoder.

The word array in the present application refers to a group, block or vector grouped in rows and/or columns.

A problem in high-speed marking or printing is adapting the laser marking system to changes in the printing that is to be marked owing to the different product requirements. Laser marking may vary throughout the marking operation, owing to a change in the product to be marked or a change in the image or characters to be marked on the surface of the product for marking.

The present invention is intended to be applied in those cases where various images are to be marked, which share some common aspect on the surface of an object, and consists of optimising the control method by dividing the image for marking into a fixed portion of the image (which corresponds to the common points among the variations in the image) and a variable portion of the image (which corresponds to the points of differentiation among the variations in the image). Given that the images to be marked normally have different variations, with the method according to the invention it is not necessary to process the entire image in each marking operation. The control system transforms said variable and invariable portions of the image into a variable matrix and an invariable matrix respectively. Said two matrices are then combined to form a complete N×M matrix of dots to be marked.

Subsequently if there is a new variation in the image it is only necessary to process the variable portion of the image, which is transformed into a new variable matrix. Said new variable matrix is combined with the previously calculated fixed matrix to form a complete new N'×M' matrix of dots to be marked for the new variation of the image.

Optimisation of machine control is achieved using said control method which reduces the modification time and therefore also reduces the marking time. The image to be marked can therefore be modified without increasing the marking time.

Said method therefore has an advantage compared to the prior art as it is not necessary to process all the data completely in order to mark different variations of the same image using a laser marking system.

The present invention discloses a method of controlling a laser marking matrix system, the matrix system comprising an N×M matrix of lasers to produce the laser marking, N being the vertical or raster dots, and M the number of dots over the width of the matrix, N and M being at least two dots and the method comprising the sequential transformation of at least two images to be marked into a series of marking commands according to an N×M matrix of dots, characterised in that it comprises the following phases:

division of a first image into a fixed portion of the image and a variable portion of the image, transformation of the fixed portion of the image into a fixed matrix and the variable portion of the image into a variable matrix, combination of said fixed and variable matrices, forming the complete N×M matrix of the dots to be marked, laser marking of the first matrix on the surface to be marked, processing of a second image, obtaining a new variable matrix which is added to the previous fixed matrix, producing a complete new N'×M' matrix corresponding to a new image, laser marking of the second matrix on the surface to be marked.

Preferably in said method of controlling a laser marking matrix system, the laser marking phase is coordinated with an encoder, which supplies position data in real time for the product to be marked in order to adapt the printing or any variation of said printing to the surface of the product to be marked.

The present invention also discloses a laser marking matrix system which comprises:

at least one array of laser diodes for each N or N×M matrix, N being the vertical or raster dots, and M the number of dots over the width of the matrix, N and/or M being at least two dots, some flexible cables to conduct the power from a control box to a print head, a marking control system to generate the various signals which are applied to said laser diodes and to the optical focusing means in order to produce the marking according to an N×M dot matrix, characterised in that said control system has:

a divider of the image to be marked into a fixed portion of the image and a variable portion of the image, means for transforming the fixed portion of the image into a fixed dot matrix and the variable portion of the image into a variable matrix, module for combining said fixed and variable matrices, forming the complete N×M matrix of dots to be marked.

Preferably the diode array comprises at least one laser diode for each dot of the N or N×M matrix.

Preferably the flexible cables are fibre optic threads to conduct the laser beam, coming from each of the laser diodes, to optical focusing means or optical means for generating the image on the surface to be marked.

Preferably the flexible cables are electric cables which supply the laser diodes when said diodes are positioned in the print head.

Preferably the laser marking matrix system has at least one optical system which adapts the laser beams of the diode array at the entry to a matrix of micro-mirrors, said micro-mirrors selectively reflecting the laser beams which come from the laser diodes in order to form the desired image, a specific micro-mirror corresponding to each laser beam.

Preferably the laser marking matrix system has a marking control system to generate the different signals which are applied to said laser diodes and to the means for directing the laser beams in order to produce the marking according to an N×M dot matrix.

Preferably said system groups together the following three elements:
- a component box in which said marking control system is arranged,
- a flexible cable which connects the component box with a print head,
- a print head.

Preferably the print head comprises a distributor for arranging said fibre optic threads in an N or N×M matrix and said optical focusing means.

Preferably the print head comprises said laser diode arrays.

Preferably the component box comprises said laser diode arrays for each N or N×M matrix.

Preferably, the optical focusing means comprise a single lens or a plurality of lenses arranged in such a way that all the laser beams, coming from the various diodes, exit through the same laser output of the print head.

Preferably, said system is used in combination with a substrate or pigment deposition on said surface to be marked.

The present invention constitutes a high-speed and high-output industrial marking and encoding solution with a large number of laser beams which operate in parallel (as many as hundreds of laser beams). Said solution is envisaged as a modular and scalable design to be implemented on a platform which contains a general-purpose processor for image processing and management and a specific process for the individual laser beams. This allows the marking and encoding of the variable information across different printing platforms, different substrates and different print widths.

The present invention improves output at system level and improves the speed of applications in real time. At the same time, said solution is flexible in terms of its capacity to be implemented in different devices depending on cost and output requirements.

The present invention can be implemented in standard industrial processes. The devices resulting from said invention can be used on packing lines and production lines. The present invention can be applied to encoding and marking systems for use in industrial manufacture to mark packaged products in an area which is coated with pigment-based thermochromic inks.

The operation of the laser beams is synchronised with the movement of the products.

For a better understanding of the invention, the accompanying drawings of an example of embodiments of the present invention are given as an explanatory but non-limiting example.

Figure 1:
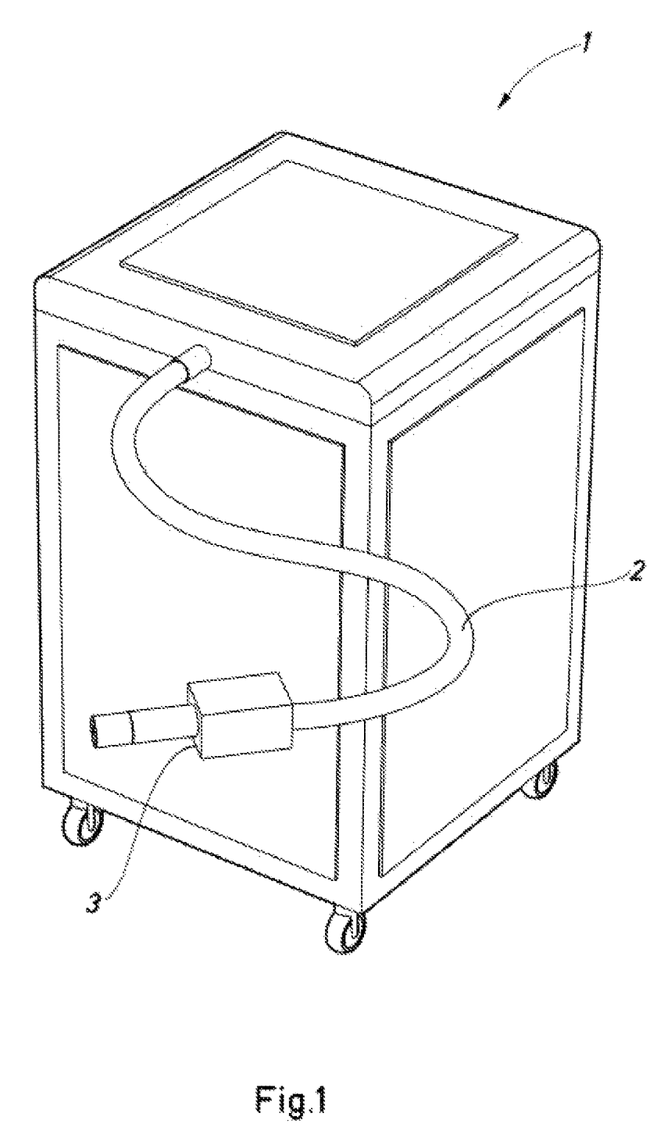
FIG. 1 is a diagrammatic perspective view of the three portions of the system: the print head, the component box and the fibre optic cable.

FIG. 1 is a diagrammatic perspective view of the different physical portions that make up the equipment of a laser marking system according to the present invention, namely, a component box -1-, a flexible fibre optic cable -2- which connects the laser diodes with a print head -3-. It can be seen that the component box -1- is the most voluminous portion of the example of the laser marking system. The print head -3- has very small dimensions. Owing to the flexibility of the fibre optic cable -2- the print head -3- can be placed more easily in positions which in prior systems, with a more voluminous head, were not possible.

In this first embodiment of the invention at least one laser diode is arranged for each dot of an N or N×M matrix, N being the vertical or raster dots, and M the number of dots over the width of the matrix, N or M being at least two dots.

The fibre optic cable -2- formed of fibre optic threads conducts the laser beam coming from each of the laser diodes to optical means for focusing on the surface to be marked.

Figure 2:
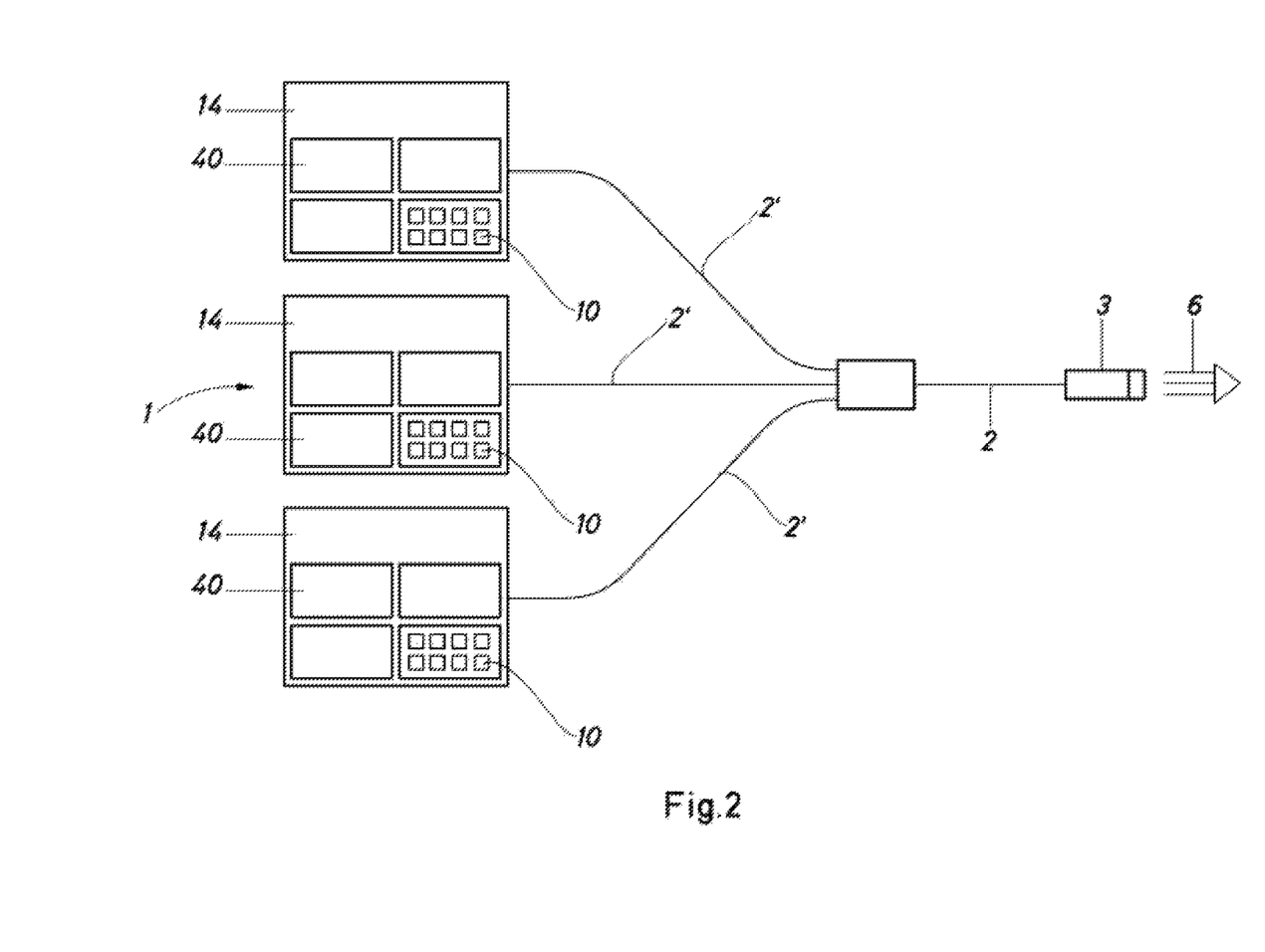
FIG. 2 is a general operating diagram of the laser marking matrix system of the first preferred embodiment of the present invention.

FIG. 2 is a diagram in which the operation of the laser marking matrix system of the first embodiment of the present invention is shown in a preferred embodiment. Said component box -1- comprises diode modules -14-, each module having groups -40- of laser diodes -10-. The laser energy of each group of diodes -40- is transmitted via a module cable -2'-. Said cable -2'- contains a fibre optic thread for each laser diode -10-. The various module cables -2'- are combined forming the fibre optic cable -2- which extends to the print head -3- which emits the laser beam -6-. The structure shown is modular, and the number of diode modules -14- can be increased or reduced.

Figure 3:
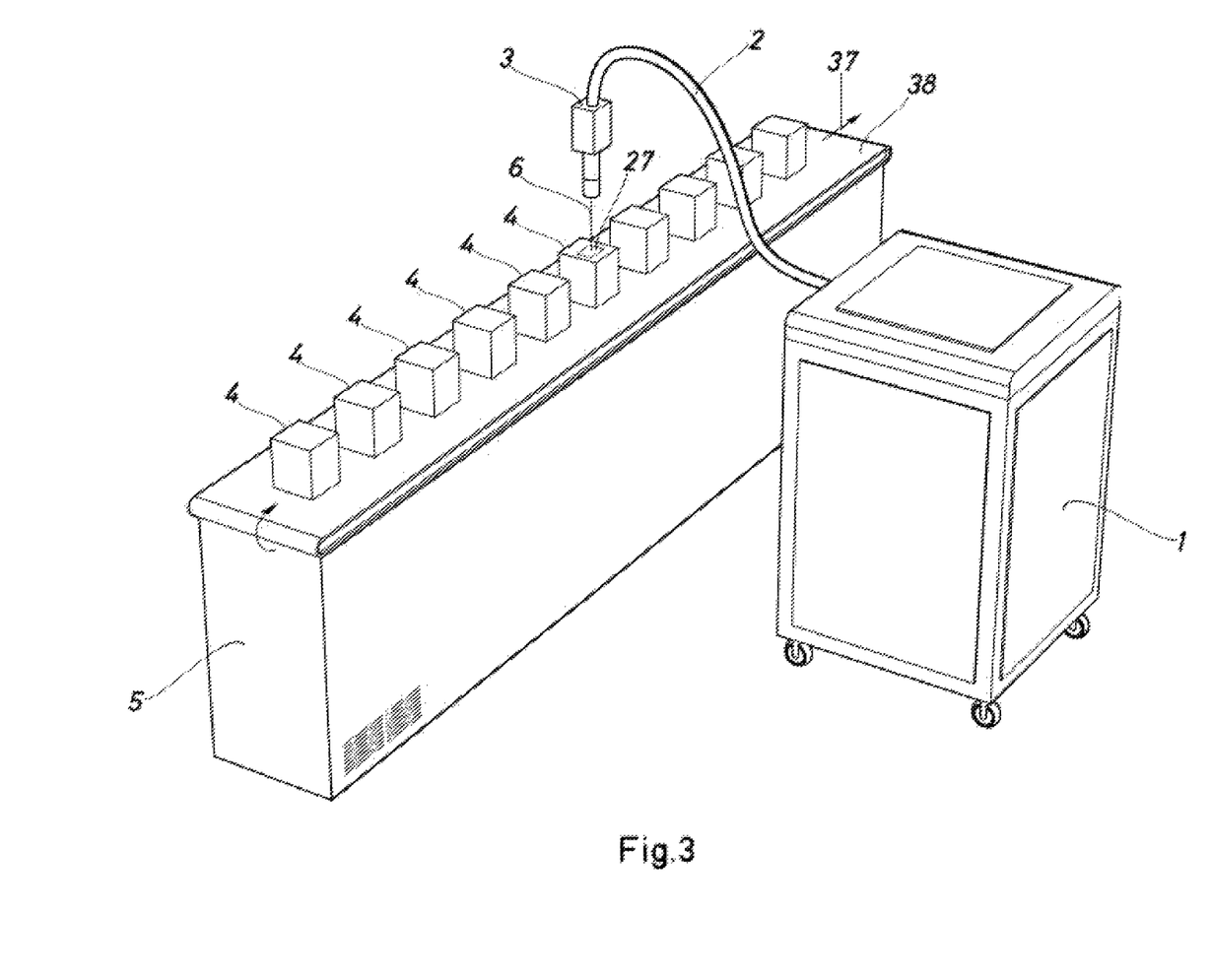
FIG. 3 is a diagrammatic perspective view of an industrial application of the laser marking matrix system of the first preferred embodiment of the present invention in a marking line.

FIG. 3 is a diagrammatic perspective view of an industrial application of the laser marking matrix system of the first embodiment of the present invention in a production line, specifically in a production line -5- in which a plurality of products -4- are arranged which move on a conveyor belt -38- in the direction marked by the arrow -37-. The component box -1- is moveable and is situated at a distance from the production line -5- owing to the length and flexibility of the fibre optic cable -2- which connects said box with the small sized print head -3-. The print head -3- can be adapted to different positions within the marking line depending on which location is most appropriate for marking the items -4- by means of the laser beam -6- on the substrate -27-.

In said first preferred embodiment marking is produced by means of a matrix of diodes connected by fibres. In these systems the maximum print resolution (in the direction transverse to the movement of the product) is about 200 dpi (dots per inch) and is determined by the dimension of the fibre optics used (a pitch of about 127 micrometres).

Figure 4:
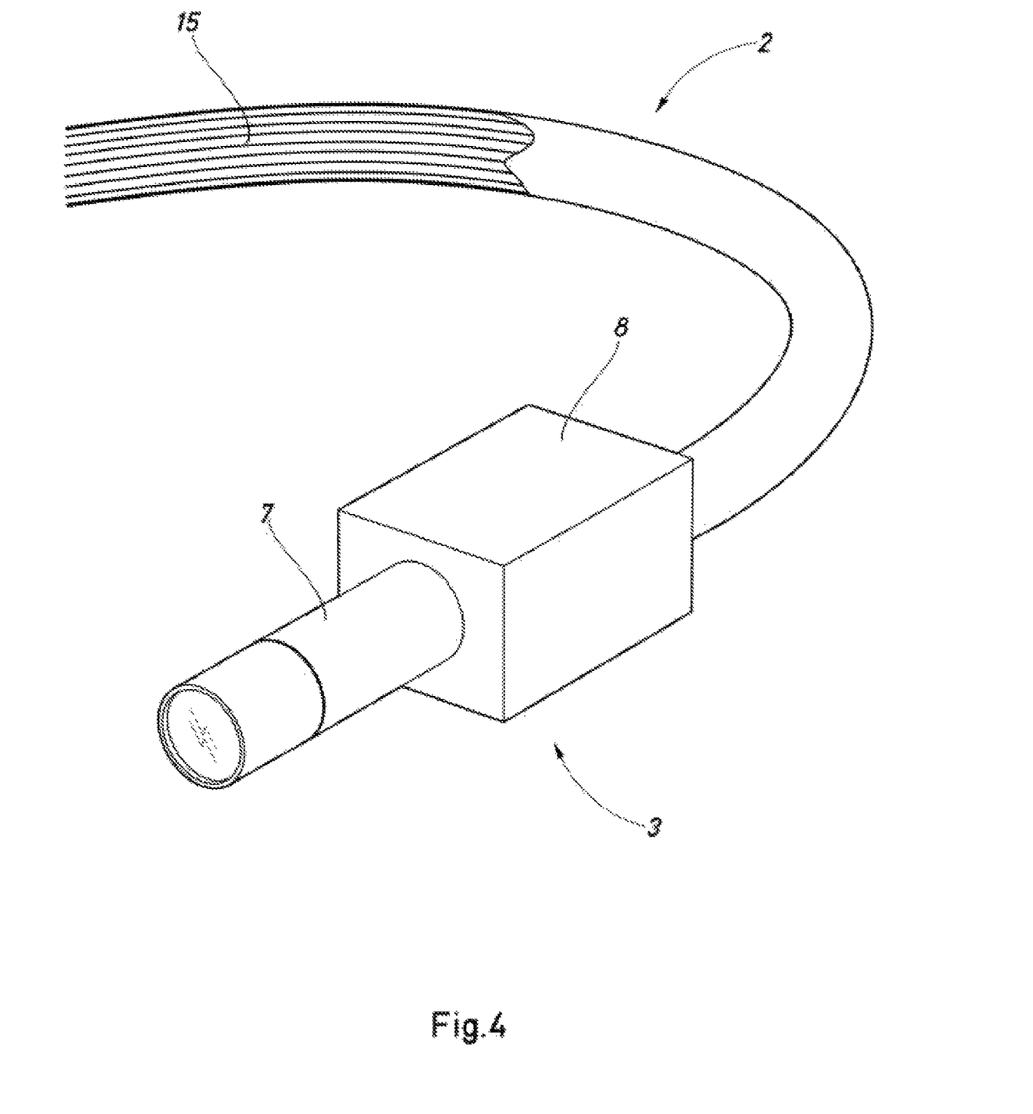
FIG. 4 is a perspective view partly in cross section of the print head and the fibre optic cable which connects said head with the component box.

FIG. 4 is a perspective view of the print head -3- made up of a fibre optic thread distributor -8- and an arrangement of lenses -7-. The fibre optic cable -2- is made up of a set of fibre optic threads -15- which come from the laser diodes -10-. Each of the fibre optic threads is distributed in the fibre optic thread distributor -8- and through the arrangement of lenses -7- each of said fibre optic threads is made to correspond with a dot to be marked on the item in question.

Figure 5:
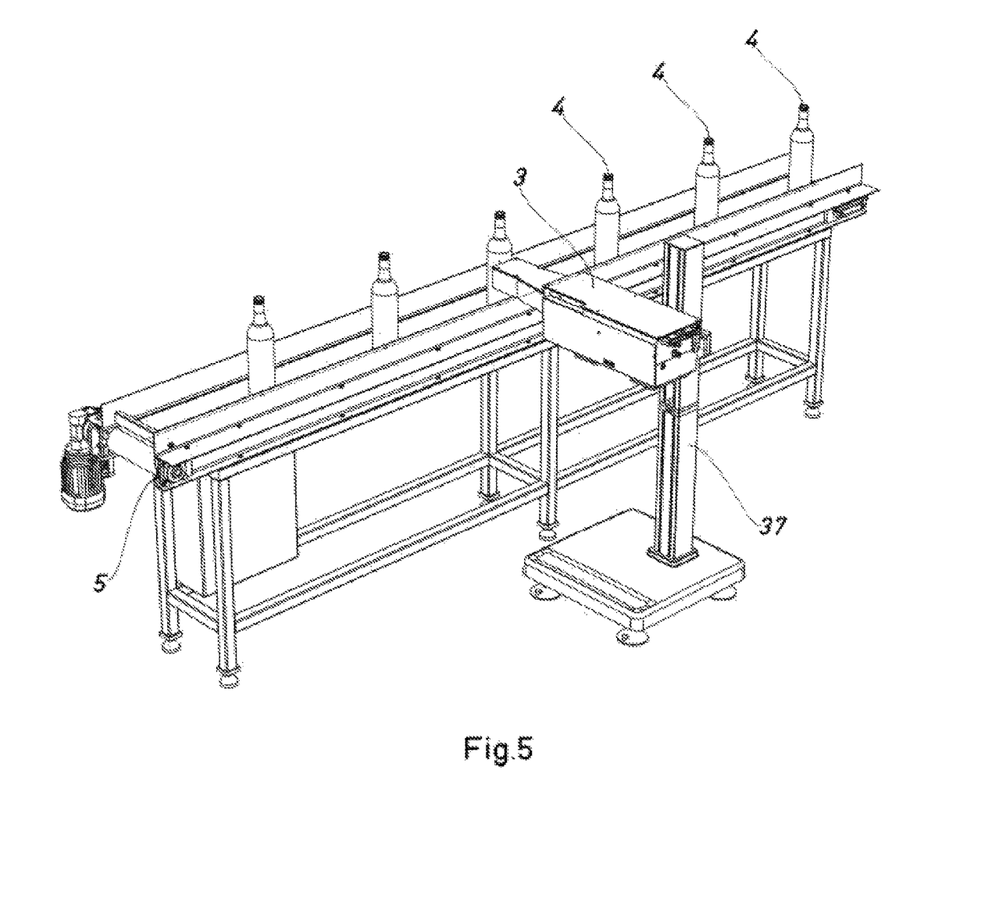
FIG. 5 is a diagrammatic view of an industrial application of the laser marking matrix system of a second embodiment of the invention in a marking line.

FIG. 5 is a diagrammatic view of the second embodiment of an industrial application of the laser marking matrix system of the present invention in a production line, specifically in a production line -5- in which a plurality of products -4- is arranged, specifically bottles. The print head -3- is clamped in the head support -37-. Said print head -3- can be adapted to different positions within the marking line depending on which is the most appropriate location for marking the products -4-.

The marking control system is arranged in the component box (not shown in FIG. 5). The laser marking matrix system has at least one array of laser diodes for each dot matrix, the diode array being the laser generator.

Said laser marking matrix system has at least one optical system which adapts the laser beams from the diode array at the entry to a matrix of micro-mirrors, said micro-mirrors selectively reflecting the laser beams which come from the laser diodes, forming the desired image.

Finally, the laser marking matrix system has a marking control system for generating the different signals which are applied to said laser diodes and to the means for directing the laser beams in order to produce the marking according to an N×M dot matrix.

The arrays of laser diodes may be positioned in the print head.

The flexible cable (not shown in FIG. 5) transmits power from the component box to the marking head. If the laser diodes are sited in the box, said cable will be a flexible fibre optic cable which conducts the high-power optical laser beam from the diodes to the optical adaptation means with the matrices of micro-mirrors. Said fibre optic cables allow the laser power to be transmitted over 8 m. If the laser diodes are sited in the print head, said cable will be a flexible electric cable.

The print head -3- comprises: electric and optical means for the formation of different laser beams to act correctly on the matrices of micro-mirrors and the optical means for directing and focusing the laser beams in an N or N×M matrix.

In said second preferred embodiment, the marking is produced by laser beam reflection onto a matrix of mirrors. In these systems, the print resolution (transverse to the movement) is about 320 dpi and the resolution in the direction of movement is about 270 dpi.

Figure 6:
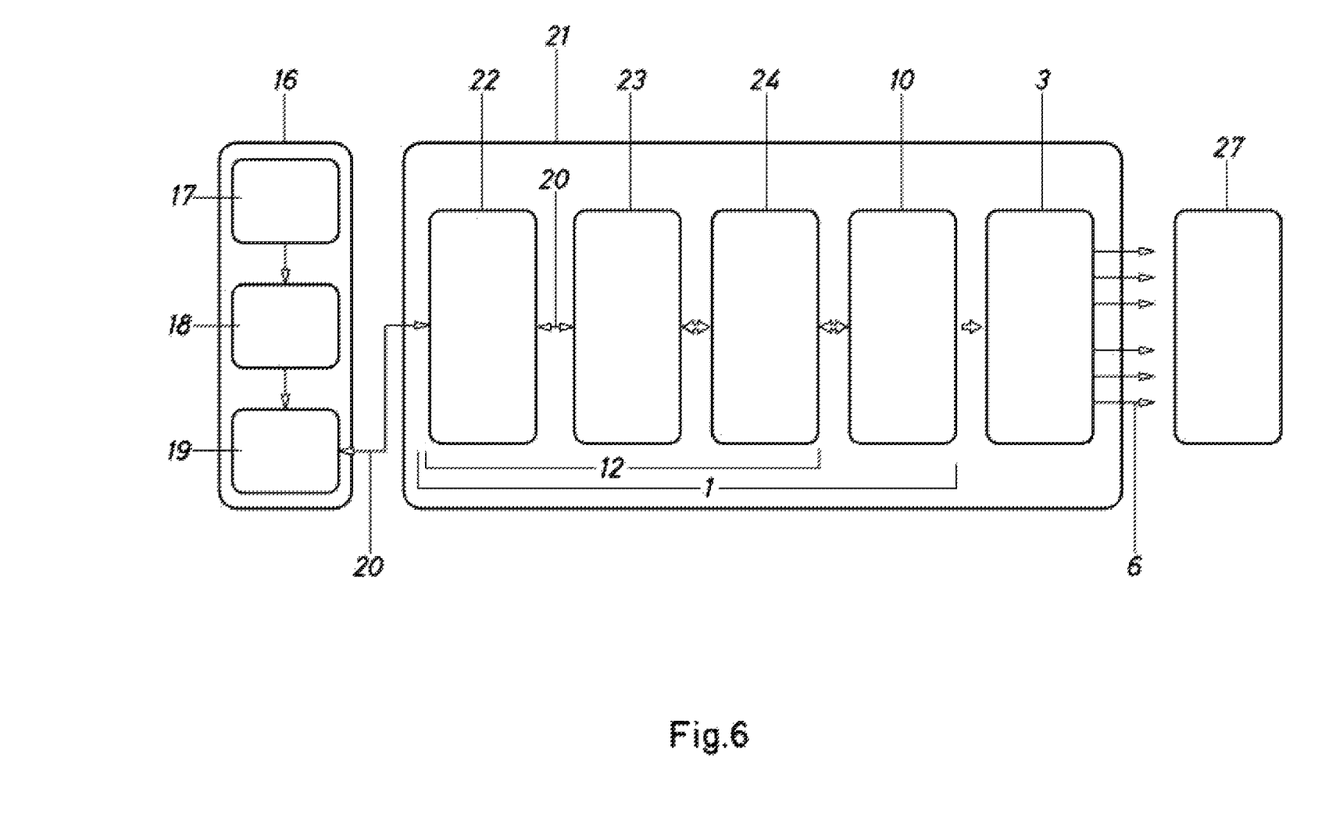
FIG. 6 is a diagram of the method of controlling the laser marking matrix system.

FIG. 6 is a diagram of the method of controlling the laser marking matrix system. The external processor -16- is made up of a graphic interface -17-, an operating system -18- and a laser controller -19-. Using communication systems -20-, such as Ethernet, information is transmitted to the marking system -21-. Said marking system is made up of a component box -1- and a print head -3-. The component box -1-, in turn, comprises the control system -12- and laser diodes -10- (said laser diodes -10- may be situated in the print head -3- in the second embodiment). The control system -12- is made up of an internal processor -22- which communicates with the processing block -23-, said block creating the bitmap image. The distribution block -24- processes the electric signal through laser diodes -10- which generate and transmit the laser beam -6- through fibre optics to the print head -3-. Said laser beam is applied to the substrate -27- and marks the item.

Figure 7:
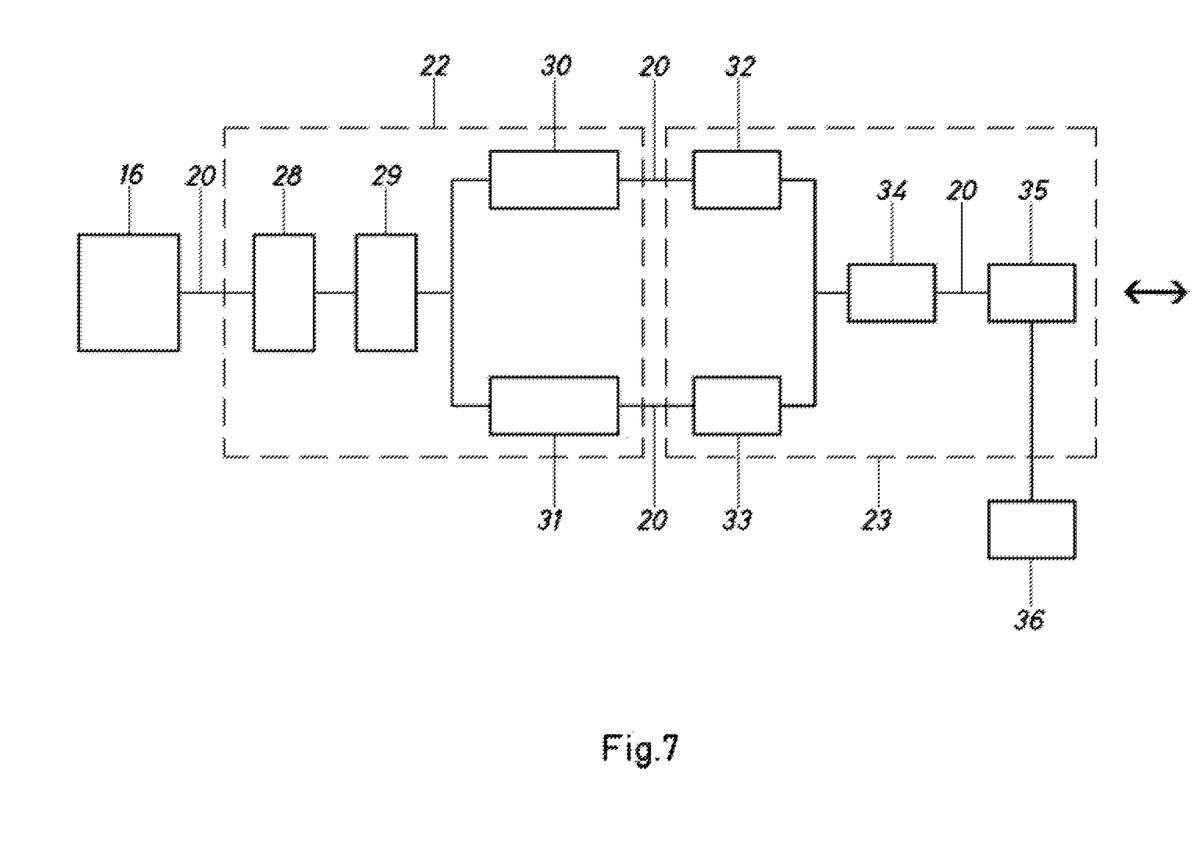
FIG. 7 is a detail of the diagram of the method of controlling the laser marking matrix system of FIG. 6.

FIG. 7 is a detail of the diagram showing the control method of FIG. 6, specifically, the internal elements of the internal processor -22- and of the processing block -23-.

The external processor -16- designs the images to be printed and encodes said images using one of the formats accepted by the system. Using communication systems -20-, such as Ethernet, the encoded images are transmitted to the internal processor -22-.

The internal processor -22- interprets the encoded images, generates the decoded internal images -28- and adds said decoded images to the print queue -29-. At this point, on the one hand, a portion of the decoded internal invariable image of the active design in the print queue is converted into a dot matrix of the image -30- and on the other hand, there is a periodic or occasional conversion of a portion of the decoded internal variable image of the active design in the print queue into a dot matrix of the image -31-.

Portions of the variable and invariable image should be understood as meaning two types of data originating from the design of the images to be printed. For example, a variation in an image to be printed is broken down into an invariable portion (the common portion of an image) and a variable portion (the different variations of the image). The invariable portion of the image may also be referred to as the fixed portion of the image.

The invariable -30- and variable -31- portions of the image are transmitted by means of transmission systems -20- to the processing block -23-. Said portions -30- and -31-, respectively, correspond to an N'×M' invariable dot matrix of the image -32- and on the other hand the decoded internal variable portion is converted into an N"×M" variable dot matrix of the image -33-. Next, said matrices -32- and -33- are combined forming the N×M matrix -34- of dots to be marked on the surface of the object. Said matrix -34- is transmitted via transmission systems -20- to the hardware controller or driver -35-. An encoder -36- and other information signals from the production line (product detection, message selection, etc.) are in communication with the driver -35- providing said driver with information in real time to adapt the printing and any variation of the product to be printed, for example, the encoder -36- may be a position sensor.

By means of the example shown, it is possible to obtain:
Wide images, for example 50 mm.
High-speed printing, for example 2 m/s.
High resolution, for example 200 dpi (dots per inch).

The present invention, in the first embodiment thereof, allows a very significant reduction in the size of the print head to be achieved compared with present print heads. In the present laser marking systems, the dimensions of a standard print head are usually much greater than those of the novel print head as the dimensions of a preferred embodiment of the present invention based on laser diodes owing to the design thereof are less than 70 mm wide by 70 mm high by 150 mm long.

Said reduction in the size and weight of the head allows great versatility when situating the print head in the assembly line in order to mark different products. Because of both the size and the weight thereof and the mobility provided by the fibre optic cable, it is much easier to change the arrangement of the print head if said head needs to be adapted to a variation or to a new production line.

The fibre optic cable transmits all the information in order to mark the different items and as a preferred embodiment, has a length of over 3 m.

The present invention is valid for any image width.

Systems with different image widths are disclosed: narrow width (approximately 20 mm); medium width (approximately 40-60 mm); and large width (approximately 80-100 mm). Said systems allow maximum print speeds of between 0.5 m/s and 3 m/s, depending on the sensitivity of the product to be marked to the laser beam and the laser power applied to the product.

Although the invention has been presented and described with reference to embodiments thereof, it will be understood that said embodiments do not limit the invention, and there may therefore be many variable structural or other details which may be obvious to persons skilled in the art in the sector after interpreting the subject matter which is disclosed in the present description, claims and drawings. Thus, all variants and equivalents are included in the scope of the present invention if said variants and equivalents can be considered to fall within the broadest scope of the following claims.

What is claimed is:

1. A method of controlling a laser marking matrix system, the matrix system comprising an N×M matrix of lasers to produce the laser marking, N being the vertical or raster dots, and M being the number of dots over the width of the matrix, N and M being at least two dots, the method comprising the sequential transformation of at least two images to be marked into a series of marking commands according to an N×M matrix of dots, wherein the method comprises the following phases:
    dividing a first image into a fixed portion of the first image and a variable portion of the first image,
    transforming the fixed portion of the first image into a fixed matrix and the variable portion of the first image into a variable matrix,
    combining said fixed and variable matrices to form the N×M matrix of the dots to be marked corresponding to the first image,
    laser marking of the N×M matrix of dots corresponding to the first image on the surface to be marked,
    processing of a second image by obtaining a new variable matrix which is added to the previous fixed matrix to form a N×M matrix of dots corresponding to the second image,
    laser marking of the N×M matrix of dots corresponding to the second image on the surface to be marked.

2. the method of controlling a laser marking matrix system according to claim 1, wherein the laser marking phase is coordinated with an encoder, which supplies position data in real time for the product to be marked in order to adapt the printing or any variation of said printing to the surface of the product to be marked.

3. A laser marking matrix system, which comprises:
    at least one array of laser diodes for each N or N×M matrix, N being the vertical or raster dots, and M being the number of dots over the width of the matrix, N and/or M being at least two dots,
    some flexible cables to conduct the power from a control box to a print head,
    a marking control system to generate various signals which are applied to said laser diodes and to an optical focusing means in order to produce the marking according to an N×M matrix of dots,
    wherein said control system comprises:
        a divider of an image to be marked into a fixed portion of the image and a variable portion of the image,
        means for transforming the fixed portion of the image into a fixed dot matrix and the variable portion of the image into a variable matrix,
        module for combining said fixed and variable matrices to form the N×M matrix of dots to be marked.

4. The laser marking matrix system according to claim 3, wherein the diode array comprises at least one laser diode for each dot of the N or N×M matrix.

5. The laser marking matrix system according to claim 3, wherein the flexible cables are fibre optic threads to conduct the laser beam, coming from each of the laser diodes, to optical focusing means or optical means for generating the image on the surface to be marked.

6. The laser marking matrix system according to claim 3, wherein the flexible cables are electric cables which supply the laser diodes when said diodes are positioned in the print head.

7. The laser marking matrix system according to claim 3, wherein said system comprises at least one optical system which adapts the laser beams of the diode array at the entry to a matrix of micro-mirrors, said micro-mirrors selectively reflecting the laser beams which come from the laser diodes in order to form the desired image, a specific micro-mirror corresponding to each laser beam.

8. The laser marking matrix system according to claim 3, wherein said marking control system generates different signals which are applied to said laser diodes and to the means for directing the laser beams in order to produce the marking according to the N×M matrix of dots.

9. The laser marking matrix system according to claim 3, wherein said system groups together the following three elements:
    a component box in which said marking control system is arranged,
    a flexible cable which connects the component box with a print head,
    a print head.

10. The laser marking matrix system according to claim 9, wherein the print head comprises a distributor for arranging said fiber optic threads in the N or N×M matrix and said optical focusing means.

11. The laser marking matrix system according to claim 9, wherein the print head comprises said laser diode arrays.

12. The laser marking matrix system according to claim 9, wherein the component box comprises said laser diode arrays for each N or N×M matrix.

13. The laser marking matrix system according to claim 3, wherein the optical focusing means comprise a single lens or a plurality of lenses arranged in such a way that all the laser beams, coming from the various diodes, exit through the same laser output of the print head.

14. The laser marking matrix system according to claim 3, wherein said system is used in combination with a substrate or pigment deposition on said surface to be marked.

* * * * *